Jan. 15, 1929.
F. H. GOODRICH
1,699,428
VEHICLE BUMPER
Filed Sept. 9, 1927 — 2 Sheets-Sheet 2
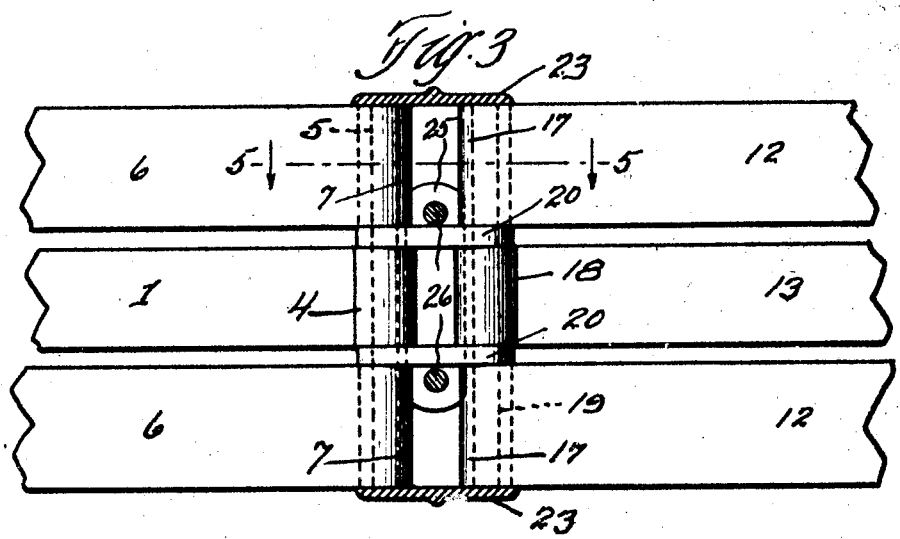
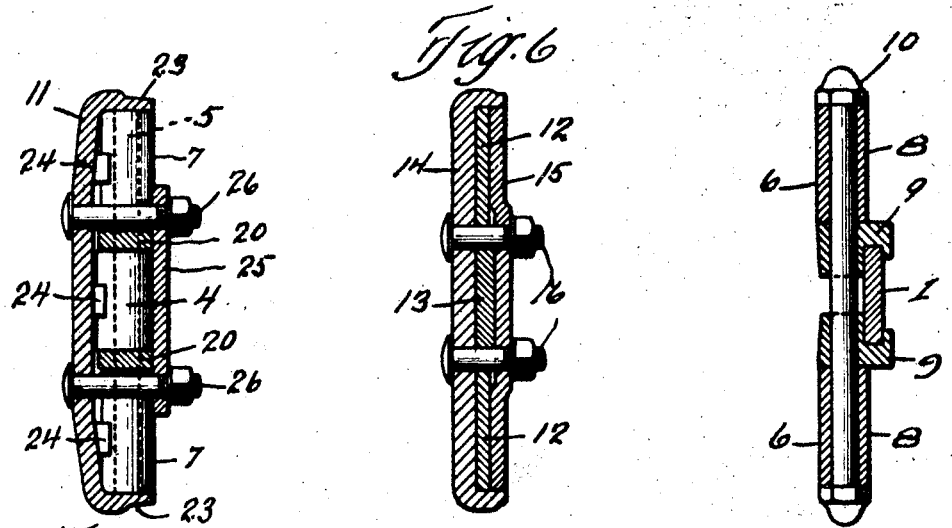
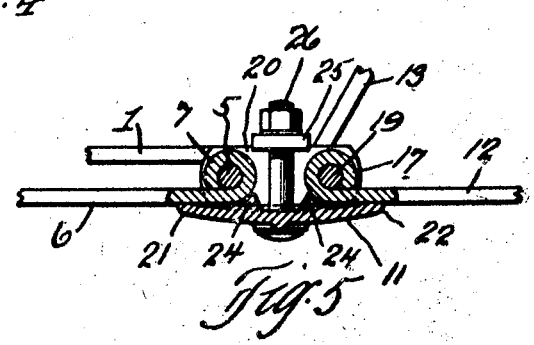
Inventor
Francis H. Goodrich
By
Hull, Brock and West
Attorney Patented Jan. 15, 1929.

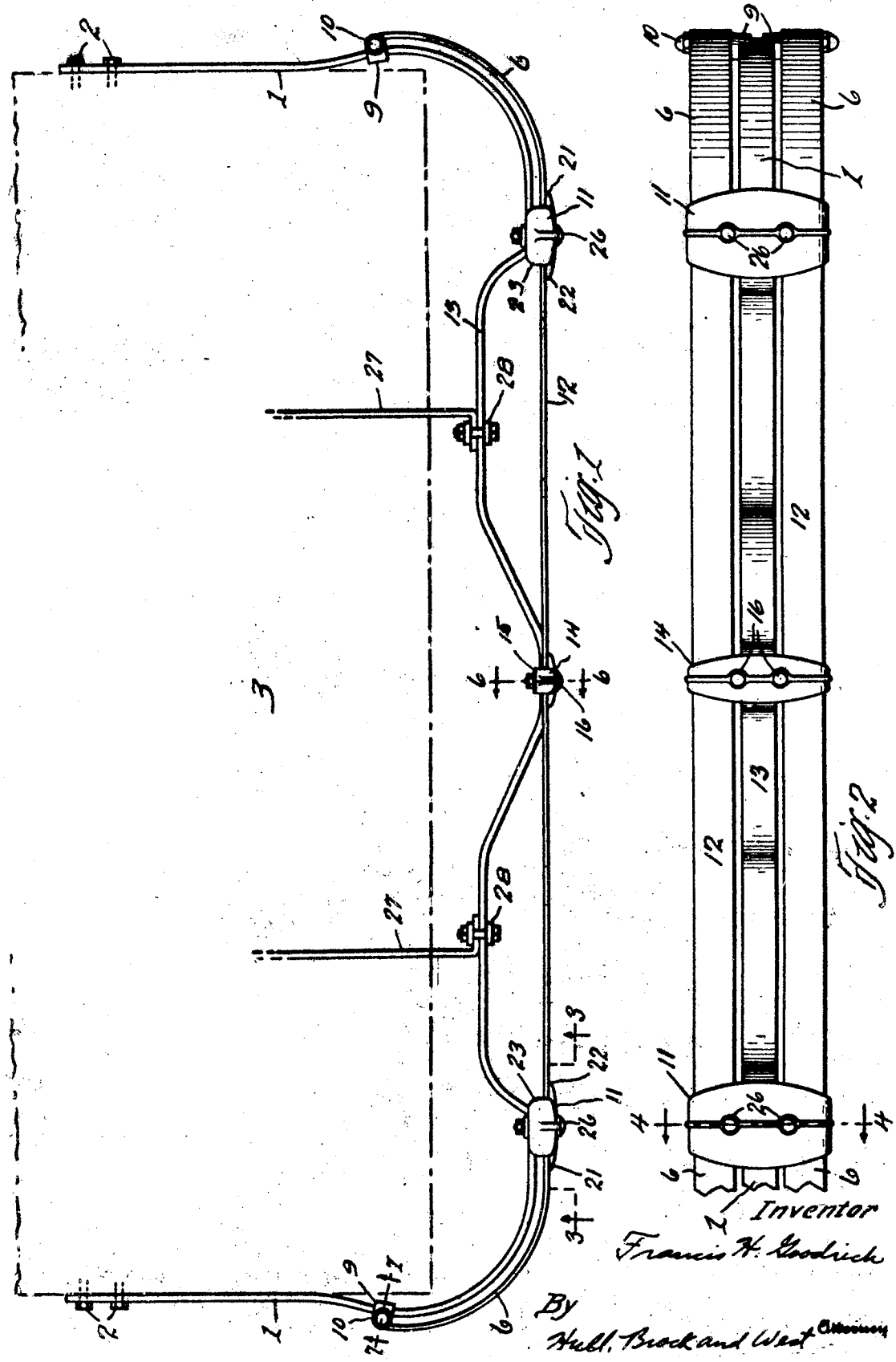

1,699,428

UNITED STATES PATENT OFFICE.

FRANCIS H. GOODRICH, OF DETROIT, MICHIGAN, ASSIGNOR TO THE C. G. SPRING & BUMPER COMPANY, OF DETROIT, MICHIGAN, A CORPORATION OF DELAWARE.

VEHICLE BUMPER.

Application filed September 9, 1927. Serial No. 218,420.

This invention relates to vehicle bumpers and more particularly to a bumper adapted to protect the end and corners of a heavy vehicle such as a bus or truck. A general object of the invention is to provide a bumper which will give the maximum protection to the exposed portions of the vehicle, against blows coming from any angle.

A further object is to provide a bumper made up of separate units, each adapted to protect a portion of the vehicle and together adapted to protect the entire exposed portion. A further object is to provide a bumper including duplicate parts which may be conveniently and inexpensively manufactured and assembled. A further object is to produce a bumper made up of sections which are flexibly connected and so avoid transmitting the bending forces in one section to an adjacent section. A further object is to provide a bumper made up of sections fastened together without weakening the bars by drilling holes therein. Another object is to provide such a bumper which will at the same time present an attractive appearance upon the vehicle.

Further and more or less limited objects will be apparent from the following description, from the drawings and from the use of the articles covered by the several claims.

In the following description and claims the impact section or the section farthest removed from the vehicle will be considered as the front of the bumper and the terms "front" and "rear" will be used in view of such assumption but it is not intended thereby to limit the use of the bumper to any particular portion of the vehicle.

In the drawings Fig. 1 is a plan view of my bumper; Fig. 2 a front elevation of the same; Fig. 3 a sectional view taken on the line 3—3 of Fig. 1; Fig. 4 a sectional view taken on the line 4—4 of Fig. 2; Fig. 5 a sectional view taken on line 5—5 of Fig. 3; Fig. 6 a sectional view taken on line 6—6 of Fig. 1 and Fig. 7 a sectional view taken on line 7—7 of Fig. 1.

Of the several reference characters 1, 1 denote a pair of support members fastened at their rear ends, by any suitable means such as the bolts 2, 2, to the vehicle 3, which is here indicated in dotted lines. The support members 1, 1 are preferably of resilient material and outwardly bowed and they may extend around the corner of the vehicle to a point spaced inwardly from the sides thereof. At the inner or front end of each of the support members 1 there is provided an eye 4 (Fig. 3) adapted to receive a pin 5. A pair of curved corner impact members 6, 6, each having an eye 7 at its front or inner end and an eye 8 at its rear or outer end, are connected to each of the support members 1, 1. These impact members are preferably spaced outwardly from the support members and placed above and below the latter in order to give a broadened impact surface. The outer or rear ends of the impact members 6, 6 are fastened to a support bar 1 by means of clamp members 9, 9 having notches provided to receive the edges of the bar 1, and a bolt 10, adapted to pass through the eyes 8 and suitable apertures in the clamp members 9, 9. The inner or front ends of the impact bars 6, 6 are fastened to a support arm 1 by means of a pin 5 passing through the eyes 7, 7 and the eye 4; said pin being held in position by projecting portions 23 of the clamp plate 11, to be described more in detail hereinafter.

The central portion of the end of the vehicle is protected by an impact section made up of a pair of vertically spaced impact bars 12, 12 and a rearwardly spaced support bar 13 connected at its end and central portions to the impact bars 12, 12. The central portion of the support bar 13 is bent forwardly and is clamped between and/or to the central portions of the impact bars 12, 12 by means of a central clamp made up of a front plate 14 adapted to bear upon the front surfaces of the impact and support bars and upon the edges of the impact bars, a rear plate 15 adapted to bear upon the rear surfaces of the said bars, and bolts 16, 16 passing through suitable apertures in the plates 14 and 15 and between the impact and support bars. The ends of the support bar 13 are bent forwardly for connection to the ends of the impact bars 12, 12. The ends of the bars 12, 12 and the ends of the support bar 13 have aligned eyes, 17 and 18 respectively, adapted to receive pins 19.

The central impact section is connected to a corner impact section at each side of the vehicle by means of links 20, 20 having apertures at each end adapted to receive the pins 5 and 19. The clamp plate 11 is adapted to bear upon the front surfaces of the end portions of the impact bars 6, 6 and 12, 12 at 21 and 22. This plate has rearwardly projecting portions 23, 23 at its top and bottom adapted to cover and bear upon the exposed upper and lower ends of the eyes 7, 7. Between the top and bottom of the plate projecting portions 24, 24, 24 extend rearwardly to a position between the eyes at the adjacent ends of the corner and central impact sections. These projecting portions are provided with inclined surfaces adapted to bear upon the said eyes. The rear clamp plate 25 bears on the rear edge surfaces of the links 20, 20 and the plates 11 and 25 are drawn toward each other by means of the bolts 26, 26. The inclined surfaces of the projecting portions 24, 24 tend to force apart the eyes at the adjacent ends of the corner and central impact sections, while the links 20, 20 limit their lateral movement. The pins 5 and 19 are retained in position by the projecting portions 23, 23 of the plate 11 and may have felt washers (not shown) at their ends to prevent rattling.

Support arms 27, 27 clamped at 28 to the rearwardly extending portion of the support bar 13 and preferably fastened at their rear ends to the frame of the vehicle, support the central portion of the bumper.

The corner impact bars 6, 6, spaced from the support bars 1, 1 present a resilient impact surface. These bars may be of standard shapes and dimensions so that they may be easily replaced. If the impact is of sufficient force the bars 6, 6 will be distorted, and/or the clamps 9 will slide upon the bars 1, and the arched support bar 1 will provide an additional resistance to the force of the impact. It is apparent, however, that if desired the support and impact bars may be placed in the same plane. The rearwardly extending support bar 13 provides means for supporting the central portion of the bumper and adds reinforcement to the impact sections.

The clamps between the center and corner impact sections provide convenient means for pivotally connecting these two sections. Such pivotal connections provide flexibility between the several sections of the bumper and so prevent bending of the bars at these points and resultant weakening or breaking of the same. Such pivotal connections also allow a distortion of one section of the bumper without a transmission of the bending forces to the adjacent section.

The pins passing through the eyes at the ends of the bars, together with the projecting portion of the clamp plate adapted to cover the ends of said eyes and so retain said pins, provide a convenient means for quickly and securely assembling said sections, and obviate the necessity of using bolts for this purpose.

The inclined surfaces of the rearwardly projecting portions of the clamp plate, tending to separate the sections, will force the pins against the outer edges of the apertures in the links and so provide a close pivotal connection and avoiding rattling. The clamp plates 11, adapted to bear upon the front surfaces of the impact bars at both sides of the pivotal connectors, prevent the links from turning to such a position that the end of one section will overlap that of the other.

By the means described for connecting the several sections I have obviated the use of holes through the bars of the bumper at these points and so avoided the weakening of the bar by such holes.

It is apparent that the links 20, 20 might be replaced by other suitable connectors such as a yoke adapted at its ends to partly surround said pins. It is also apparent that the links 20, 20 might be made an integral part of the plate 11 or the plate 25; such modifications are clearly within the scope of my invention.

It is further apparent that the sections of the bumper may be of different construction and, although I have described a preferred embodiment of my invention, it is apparent that various modifications may be made to suit the particular conditions under which the bumper is to be used. It is not intended to hereby restrict the invention to the particular embodiment shown.

Having thus described my invention, what I claim is:

1. A vehicle bumper including a pair of spaced impact sections adapted to extend around corners of a vehicle, a resilient central impact section adapted to extend between the ends of said corner impact sections and pivotal links for connecting said impact sections.

2. In a vehicle bumper the combination of a pair of outwardly bowed bars adapted to extend around and protect corners of a vehicle, a plurality of vertically spaced impact members adapted to be connected to each of said bars, a central impact section including a plurality of vertically spaced impact bars and a support bar spaced rearwardly from said impact bars intermediate its ends, and pivotal means for connecting adjacent ends of said corner and central impact sections.

3. A vehicle bumper including a pair of bars each adapted to extend around and protect a corner of a vehicle, a central impact section having its ends spaced from and aligned with the inner ends of said corner bars, and pivotal means for connecting said sections.

4. A vehicle bumper including a bar adapted to extend around and protect a corner of a vehicle, said bar having an eye at its inner end, a central impact section having its ends in substantial alignment with the inner ends of the said corner bars having an eye at an end, and means for pivotally connecting said sections, said means including a link having apertures adapted to receive pins passing through said eyes.

5. The combination with spaced sections of a vehicle bumper, of pivotal means for connecting adjacent end portions, of said sections, a plate adapted to bear upon and force apart the said end portions of said sections, and means for actuating said plate.

6. In a sectional vehicle bumper the combination with a link adapted to connect the end portions of sections of said bumper, of a plate having projections adapted to force said sections apart and means for actuating said plate.

7. In a sectional vehicle bumper the combination with a link adapted to connect adjacent sections of said bumper, of a plate having a surface adapted to bear upon and force apart said sections, and a clamping means for actuating said plate.

8. In a vehicle bumper made up of spaced sections, the combination of means for limiting lateral movement of said sections relative to each other, and means adapted to fit between said spaced sections and force them apart.

9. In a sectional vehicle bumper the combination with a link adapted to connect the end portions of said sections, of a plate adapted to bear upon surfaces of said sections, said plate having projecting portions with inclined surfaces adapted to bear upon adjacent surfaces of said sections, and clamping means for actuating said plate.

10. In a vehicle bumper having impact sections pivotally connected to each other, the combination with eyes at the adjacent end portions of said sections, of a pin adapted to fit within said eyes, and a plate adapted to cover said eyes and prevent removal of said pin.

11. In a vehicle bumper the combination with a corner impact section and a central impact section, of means for connecting said sections, said means including a link attached to adjacent portions of said sections, a plate adapted to bear upon and force apart adjacent portions of said sections, and means for actuating said plate.

12. In a vehicle bumper the combination with a corner impact section and a central impact section, each having an eye at an end, of means for pivotally connecting said sections, said means including a pin passing through said eyes, a link having apertures adapted to receive said pin, a plate adapted to bear upon said eyes and retain said pin, and means for clamping said plate to said bars.

13. In a vehicle bumper the combination with an outwardly bowed corner impact section and a central impact section, of means for pivotally connecting said sections, said means including a pin adapted to pass through eyes in the adjacent end portions of said sections, a link having apertures adapted to receive said pin, a plate adapted to cover said eyes and having projections adapted to force said sections apart, and means for actuating said plate.

14. In a bumper having sections pivotally connected to each other, the combination with eyes at the adjacent end portions of said sections, of pins adapted to fit within said eyes, links having apertures adapted to receive said pins, a plate adapted to bear upon surfaces of said sections and having projecting portions adapted to cover said eyes and retain said pins and projecting portions adapted to extend between and force apart said sections, and clamping means for actuating said plate.

15. The combination with a plurality of impact sections having adjacent ends spaced apart, of links extending between and pivotally connected to such spaced end portions, and a plate adapted to bear upon a surface of each of said adjacent portions.

16. The combination with a plurality of impact sections having adjacent ends spaced apart, of links extending between and pivotally connected to such spaced end portions, a plate adapted to bear upon a surface of each of said adjacent portions, a plate adapted to bear upon the opposite surface of said link and means for drawing said plates toward each other.

17. The combination with a plurality of impact sections having adjacent end portions pivotally connected, of a plate adapted to bear upon the outer surfaces of adjacent sections, said plate being supported so as to resist outward pivotal movement of the connected sections.

18. The combination with a pair of spaced impact sections supported at their outer end portions and a central impact section between and substantially in alignment with their inner end portions, of means for pivotally connecting said impact sections, said means comprising links connected to adjacent sections, a plate adapted to bear upon the front surfaces of said adjacent impact sections, a plate adapted to bear upon the inner surface of said links, and means for drawing said plates toward each other.

19. In a sectional vehicle bumper, the combination with a link adapted to connect the end portions of adjacent sections of said bumper, a plate adapted to bear upon the outer surfaces of said sections, a plate adapted to bear upon the inner surfaces of said links, and means for drawing said plates toward each other.

In testimony whereof, I hereunto affix my signature.

FRANCIS H. GOODRICH.